(12) United States Patent
Dellacona

(10) Patent No.: US 6,799,224 B1
(45) Date of Patent: Sep. 28, 2004

(54) HIGH SPEED FAULT TOLERANT MASS STORAGE NETWORK INFORMATION SERVER

(75) Inventor: Richard Dellacona, Riverside, CA (US)

(73) Assignee: Quad Research, Irvine, CA (US)

( * ) Notice: Subject to any disclaimer, the term of this patent is extended or adjusted under 35 U.S.C. 154(b) by 0 days.

(21) Appl. No.: 09/623,322

(22) PCT Filed: Mar. 10, 1999

(86) PCT No.: PCT/US99/05231

§ 371 (c)(1),
(2), (4) Date: Aug. 30, 2000

(87) PCT Pub. No.: WO99/46671

PCT Pub. Date: Sep. 16, 1999

Related U.S. Application Data

(60) Provisional application No. 60/077,643, filed on Mar. 10, 1998.

(51) Int. Cl.$^7$ .............................................. G06F 15/16
(52) U.S. Cl. ...................... 709/703; 709/225; 709/226; 714/2; 714/4; 714/6; 714/7; 714/8; 714/14; 713/1; 710/302
(58) Field of Search ........................ 709/203, 224–226; 714/2, 4, 6, 7, 8, 14; 713/1; 711/112, 114; 710/302

(56) References Cited

U.S. PATENT DOCUMENTS

| | | |
|---|---|---|
| 4,347,563 A | 8/1982 | Paredes et al. |
| 4,590,554 A | 5/1986 | Glazer et al. |
| 4,710,926 A | 12/1987 | Brown et al. |
| 4,773,313 A | 9/1988 | Anson |
| 4,819,159 A | 4/1989 | Shipley et al. |
| 4,871,324 A | 10/1989 | Brune et al. |
| 5,005,122 A | 4/1991 | Griffin et al. |
| 5,134,619 A | 7/1992 | Henson et al. |
| 5,140,689 A | 8/1992 | Kobayashi |
| 5,151,989 A | 9/1992 | Johnson et al. |
| 5,155,729 A | 10/1992 | Rysko et al. |
| 5,157,663 A | 10/1992 | Major et al. |
| 5,157,771 A | 10/1992 | Losi et al. |
| 5,185,693 A | 2/1993 | Loftis et al. |
| 5,210,855 A | 5/1993 | Bartol |
| 5,210,866 A | 5/1993 | Milligan et al. |

(List continued on next page.)

FOREIGN PATENT DOCUMENTS

| | | |
|---|---|---|
| EP | 0 653 759 A2 | 5/1995 |
| EP | 0 709 779 A2 | 5/1996 |
| EP | 0 760 503 A1 | 3/1997 |

*Primary Examiner*—Jack B. Harvey
*Assistant Examiner*—Hien Le
(74) *Attorney, Agent, or Firm*—Fulwider Patton Lee & Utecht, LLP

(57) ABSTRACT

The information server system incorporates a high speed, microcomputer based server running industry standard operating system software enhanced to include functionality directed to operation of a new disk array controller, which controls the physically independent or integral disk storage device array, and communications interface. The disk array controller subsystem controls and communicates with the disk storage device array with a Fiber Channel protocol. The disk storage device array incorporates a plurality of disk storage devices with a corresponding number of bypass interface cards configured to facilitate the on-line addition, removal and replacement of disk storage devices. In addition to incorporating the above described buses and Fiber Channel capability, the disk array further incorporates a physically independent Fiber Channel compatible optical bus for high speed, communication between disk storage device array subsystem components, including the internal disk storage devices, independent from the information server. A wide array of user reconfigurable options are available as well as a scalable expansion capability.

25 Claims, 2 Drawing Sheets

U.S. PATENT DOCUMENTS

| | | | |
|---|---|---|---|
| 5,218,697 | A | 6/1993 | Chung |
| 5,227,778 | A | 7/1993 | Vacon et al. |
| 5,249,293 | A | 9/1993 | Schreiber et al. |
| 5,255,367 | A | 10/1993 | Bruckert et al. |
| 5,265,098 | A | 11/1993 | Mattson et al. |
| 5,271,013 | A | 12/1993 | Gleeson |
| 5,277,615 | A | 1/1994 | Hastings et al. |
| 5,287,461 | A | 2/1994 | Moore |
| 5,297,067 | A | 3/1994 | Blackborow et al. |
| 5,343,358 | A | 8/1994 | Hilbrink |
| 5,343,477 | A | 8/1994 | Yamada |
| 5,369,757 | A | 11/1994 | Spiro et al. |
| 5,386,567 | A | 1/1995 | Lien et al. |
| 5,390,326 | A | 2/1995 | Shah |
| 5,394,526 | A | 2/1995 | Crouse et al. |
| 5,408,649 | A | 4/1995 | Beshears et al. |
| 5,410,691 | A | 4/1995 | Taylor |
| 5,412,723 | A | 5/1995 | Canetti et al. |
| 5,423,042 | A | 6/1995 | Jalili et al. |
| 5,430,876 | A | 7/1995 | Schreiber et al. |
| 5,434,994 | A | 7/1995 | Shaheen et al. |
| 5,442,749 | A | 8/1995 | Northcutt et al. |
| 5,446,736 | A | 8/1995 | Gleeson et al. |
| 5,450,578 | A | 9/1995 | Mackenthun |
| 5,450,583 | A | 9/1995 | Inada |
| 5,452,448 | A | 9/1995 | Sakuraba et al. |
| 5,454,080 | A | 9/1995 | Fasig et al. |
| 5,455,953 | A | 10/1995 | Russell |
| 5,459,863 | A | 10/1995 | Taylor |
| 5,471,099 | A | 11/1995 | Larabell et al. |
| 5,471,634 | A | 11/1995 | Giorgio et al. |
| 5,475,813 | A | 12/1995 | Cieslak et al. |
| 5,488,716 | A | 1/1996 | Schneider et al. |
| 5,502,836 | A | 3/1996 | Hale et al. |
| 5,504,882 | A | 4/1996 | Chai et al. |
| 5,513,314 | A | 4/1996 | Kandasamy et al. |
| 5,517,632 | A | 5/1996 | Matsumoto et al. |
| 5,518,418 | A | 5/1996 | Larabell |
| 5,522,031 | A | 5/1996 | Ellis et al. |
| 5,530,905 | A | 6/1996 | Nichols et al. |
| 5,537,642 | A | 7/1996 | Glowny et al. |
| 5,542,087 | A | 7/1996 | Neimat et al. |
| 5,544,339 | A | 8/1996 | Baba |
| 5,546,583 | A | 8/1996 | Shriver |
| 5,548,712 | A | 8/1996 | Larson et al. |
| 5,548,724 | A | 8/1996 | Akizawa et al. |
| 5,564,040 | A | 10/1996 | Kubala |
| 5,566,297 | A | 10/1996 | Devarakonda et al. |
| 5,579,222 | A | 11/1996 | Bains et al. |
| 5,579,491 | A | 11/1996 | Jeffries et al. |
| 5,581,552 | A | 12/1996 | Civanlar et al. |
| 5,592,611 | A | 1/1997 | Midgely et al. |
| 5,600,644 | A | 2/1997 | Chang et al. |
| 5,603,029 | A | 2/1997 | Aman et al. |
| 5,604,803 | A | 2/1997 | Aziz |
| 5,606,719 | A | 2/1997 | Nichols et al. |
| 5,608,865 | A | 3/1997 | Midgely et al. |
| 5,617,540 | A | 4/1997 | Civanlar et al. |
| 5,621,795 | A | 4/1997 | Baker et al. |
| 5,630,007 | A | 5/1997 | Kobayashi et al. |
| 5,642,515 | A | 6/1997 | Jones et al. |
| 5,644,698 | A | 7/1997 | Cannon |
| 5,652,908 | A | 7/1997 | Douglas et al. |
| 5,655,152 | A | 8/1997 | Ohnishi et al. |
| 5,664,106 | A | 9/1997 | Caccavale |
| 5,664,119 | A * | 9/1997 | Jeffries et al. ............ 710/302 |
| 5,675,723 | A | 10/1997 | Ekrot et al. |
| 5,680,538 | A | 10/1997 | Jones et al. |
| 5,692,128 | A | 11/1997 | Bolles et al. |
| 5,694,581 | A | 12/1997 | Cheng |
| 5,696,965 | A | 12/1997 | Dedrick |
| 5,701,406 | A | 12/1997 | Matsumoto et al. |
| 5,706,458 | A | 1/1998 | Koppolu |
| 5,732,137 | A | 3/1998 | Aziz |
| 5,732,240 | A | 3/1998 | Caccavale |
| 5,734,831 | A | 3/1998 | Sanders |
| 5,734,898 | A | 3/1998 | He |
| 5,737,549 | A | 4/1998 | Hersch et al. |
| 5,737,747 | A | 4/1998 | Vishlitzky et al. |
| 5,740,371 | A | 4/1998 | Wallis |
| 5,740,423 | A | 4/1998 | Logan et al. |
| 5,784,576 | A | 7/1998 | Guthrie et al. |
| 5,893,140 | A | 4/1999 | Vahalia et al. |
| 5,966,510 | A | 10/1999 | Carbonneau et al. |
| 5,974,463 | A * | 10/1999 | Warrier et al. ............ 709/225 |
| 5,974,503 | A | 10/1999 | Venkatesh et al. |

* cited by examiner

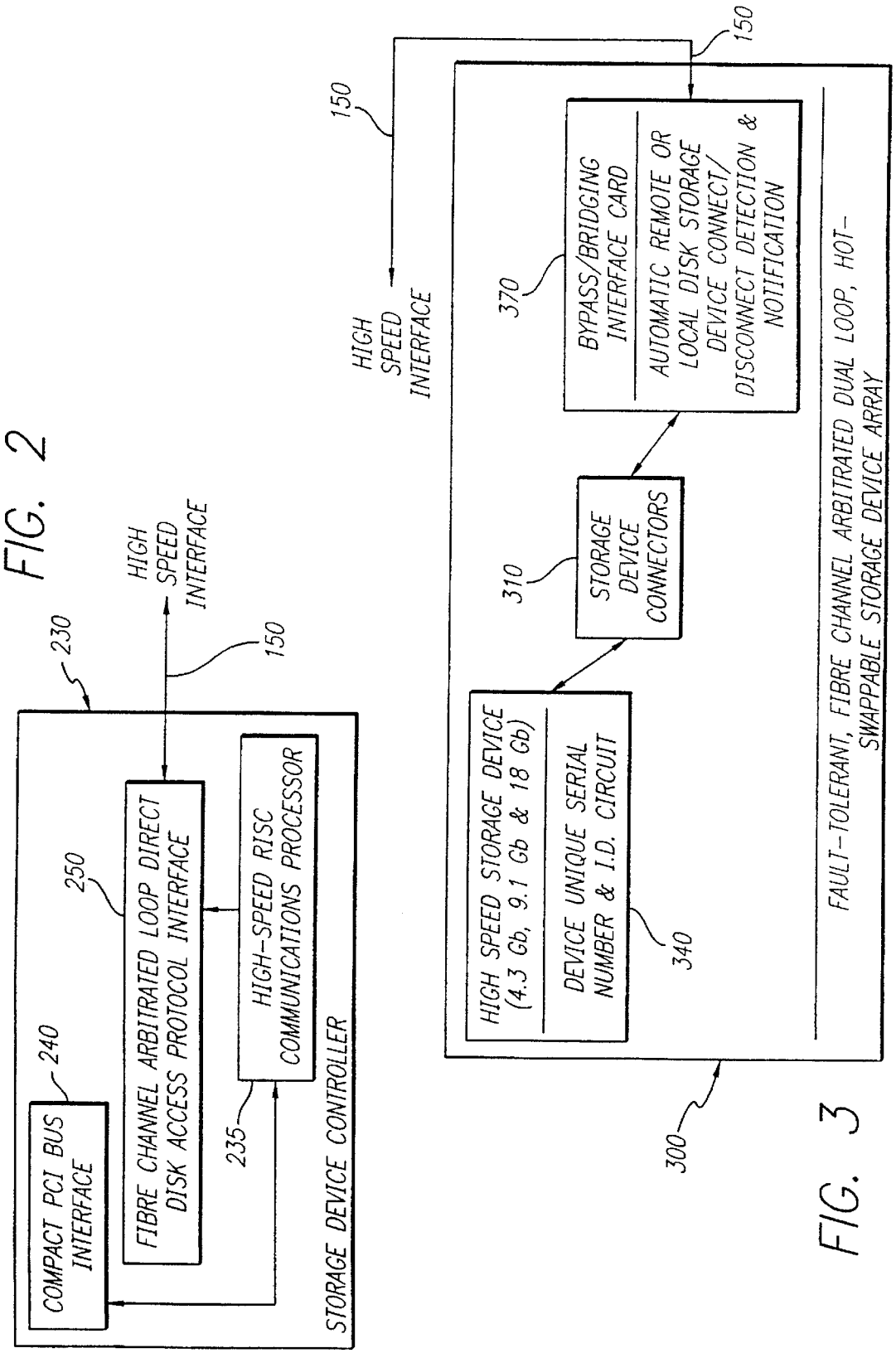

HIGH SPEED FAULT TOLERANT MASS STORAGE NETWORK INFORMATION SERVER

RELATED APPLICATIONS

This application is based upon Provisional Patent Application Ser. No. 60/077,643, filed Mar. 10, 1998.

BACKGROUND OF THE INVENTION

1. Field of the Invention

This invention relates to a "plug and play", high speed, microcomputer based, Fibre Channel compatible and fault tolerant mass storage information server system. In particular, the present invention relates to a device and method for providing an enterprise-wide information server system which incorporates a dual loop arbitrated, Fibre Channel capable, multiple-fault tolerant, hot-swappable disk array requiring no host computer.

2. Description of the Prior Art

Efforts have been made in the past to provide a mass storage file server capable of delivering information throughout an enterprise with high speed data throughput, scalable data storage capability in a convenient, easily configurable enclosure using well known, industry standard operating software. However, such systems have typically experienced many shortcomings and problems associated with the inability of presently available computer and communications hardware to sustain performance and survive failure of component devices. Such shortcomings have included the lack of capability to allow for scalability to accommodate increased storage requirements without the need to completely power down information server system to facilitate installation of additional disk storage devices or communications capability. One of the solutions presently available requires that the entire information server system be taken off-line and powered down before any additional disk storage devices can be added to the disk storage array. This and other comparable or more capable server systems require a significant amount of system administrator personnel time and server system resources to facilitate system maintenance for expansion of storage space, repair, and routine maintenance such as optimization and system health monitoring.

Other problems existing in the presently available information server systems include a general inability of the present technology to provide continuous information server capability after some predetermined number of failures have occurred in the server system. Some prior art information server systems have provided a limited fault tolerance capability. Such systems typically employ a disk array server which incorporates extra disk space substantially in excess of that needed by the enterprise serviced by the information server system. The extra disk space is incorporated into such systems with the addition of additional physical disk storage devices which are configured with a particular logical disk drive configuration tailored to meet the storage, fault tolerance and server requirements of the user.

To accomplish a desired level of fault tolerance, the disk array subsystem is configured with various types of operating system software to create duplicate and multiple copies of the data stored on the information server system across various different combinations of the physical and logical disk drives. Any of a large array of fault tolerant disk array architectures are typically employed including, for example, various implementations of what is known the trade as the redundant array of independent disks or "RAID" topologies and protocols. Upon detection of a complete or partial failure of a particular disk storage device, the operating system software program notifies the server of the failure, marks the portion of the disk which failed or logically removes the completely failed disk storage device from the disk array. Next, the operating system typically reallocates the remaining available physical disk space into a modified configuration of logical disk drives.

The operating system then reconstructs new duplicate, multiple copies of the data stored on the server system within the constraints of the newly reduced amount of free disk space. The server system also alerts the server system administrator that a failure has occurred so that corrective action may be taken.

Depending on the exact nature of the failure, the necessary corrective action can include removal and replacement of the completely or partially failed disk storage device. The remove and replace system maintenance operation requires, in many systems, that the entire server system be taken off-line and powered down before the physical replacement operation can be performed. Some information server systems permit removal and replacement of the defective disk storage device while the server system remains on-line and powered on. This process is commonly referred to by the trade as "hot-swapping" of devices. Such systems, however, require considerable hands-on intervention of the system administrator personnel to manually manipulate the hardware interfaces and operating system software for purposes of physically and logically reintegrating the newly replaced disk device into the disk array subsystem. Also, the systems capable of hot-swapping, experience severe degradation of performance resulting from the process of taking corrective action.

The process of logical reintegration requires a significant portion of the server system central processing unit and memory resources. These resources are needed to accomplish the reallocation of the newly available free disk space into the logical disk configuration of the server and the redistribution of the multiple, duplicate copies of the information stored on the server across the new and remaining physical and logical disk drives. This need for server system resources, although temporary, results in a severe decrease in the performance of the information server system.

Thus, users of presently available information server technology have generally two types of information server system options available. The first type of server system is completely unavailable for the duration of the system maintenance operation. The second type of system is, in effect, unavailable to the users due to the seriously degraded performance experienced by the information server system during the system maintenance operation. The following U.S. Patents, which are hereby incorporated by reference in their entirety, appear to disclose various types and components of the above described information server systems: U.S. Pat. Nos. 5,402,428; 5,471,099; 5,479,653; 5,502,836; 5,517,632; 5,518,418; 5,522,031; 5,530,831; 5,544,339; 5,548,712; 5,615,352; 5,651,132; 5,659,677; 5,664,119; 5,666,337; 5,680,538; 5,694,581; and 5,701,406.

As a result of the problems and shortcomings of the technology incorporated into the presently available information server systems, users are left without a satisfactory server system which is capable of, among other features, continuous uninterrupted availability, nondegraded performance and simplified, quick and easy storage space expansion, reconfiguration, repair and routine maintenance.

None of the previous devices have adequately met these needs. Thus, it is apparent that a need exists for an system which not only reduces or eliminates the shortcomings and problems associated with the currently available information server systems and related technology, but also which provides an efficient and cost-effective solution to such concerns.

SUMMARY OF THE INVENTION

The present invention is an information server system with a "plug and play", scalable, modular, fault tolerant, multi-loop, hot swappable architecture incorporating a central processing unit, a storage device controller connected to the central processing unit for controlling at least one storage device array and a communications interface system connected to the central processing unit for communicating with other systems. More particularly, the invention represents a plug and play storage system for information storage and retrieval applications and incorporates an on board computer server for the storage system, thus eliminating the requirement for resources from a host computer. The computer controls and communicates with a storage device controller and a communications interface with other systems external to the storage system. The storage device operates via a high speed interface to control an array of storage devices through their individual hot swap interface cards.

In one presently preferred embodiment, the invention provides a self contained plug and play information server system which incorporates a high speed, microcomputer based, server running industry standard operating system software enhanced to include functionality directed to operation of an array controller for a storage device such as a magnetic disk array, optical device array, solid state memory or the like, and which controls the physically independent or integral storage device array, and a communications interface. In a presently preferred form, the array controller subsystem controls and communicates with the storage device array with a Fibre Channel protocol and topology compatible 1.0625 gigabit per second copper compact PCI and/or a fibre optic interface bus and an Intelligent Input/Output, "$I_2O$" bus for control of and communication with the disk storage device array.

The storage device array incorporates a plurality of storage devices with a corresponding number of bypass, or "bridging", interface cards configured to facilitate the on-line addition, removal and replacement of storage devices. In addition to incorporating the above described buses and Fibre Channel capability, the storage device array further incorporates a physically independent Fibre Channel compatible optical bus for high speed communication between storage device array subsystem components, including the internal storage devices, independent from the information server. The problems encountered with previously available information server systems are solved by the present invention, which can be manufactured relatively inexpensively from a variety of off-the-shelf hardware and software, either in standard configurations or on a custom configured basis. In either configuration, a wide array of user reconfigurable options are available as well as a scalable expansion capability.

The present invention accordingly provides for an information server system with a scalable, modular, fault tolerant, hot swappable architecture, that comprises a central processing unit; an array controller subsystem connected to the central processing unit for controlling at least one storage device array; and a communications interface subsystem connected to the central processing unit for communicating with other subsystems of the information server and for controlling the array controller subsystem.

For convenience, and not by way of limitation, the invention will be described below in the context of magnetic disk storage devices as they represent readily available and compatible types of storage devices for information server applications. However, those skilled in the art will recognize that other storage devices and media such as optical disks, solid state memories or magnetic storage media would be applicable for various applications, depending on the state of development of the storage media technology and the application to which the system is to be put. Similarly, the invention will be described in the context of a Fibre Channel protocol and topology compatible 1.0625 Gigabit per second per second copper compact PCI and/or fibre optic interface bus and Intelligent Input/Output $I_2O$ bus as the communications link between the storage device controller and the storage device array, although other communication links may be used, depending on the array architecture, communications speed requirements and available technology for data links.

In one presently preferred embodiment, the information server system further comprises a midplane connector for connecting interface cards for components. In a currently preferred aspect of the invention, each disk storage device array comprises a plurality of disk storage devices and a corresponding number of bypass interface cards, all of which communicate with one another and the information server. In another presently preferred aspect of the invention, each disk storage device array comprises a predetermined number of bypass interface cards which populate the entire information server system, whether or not the entire information server system is fully populated with a corresponding number of disk devices. Each disk storage device is preferably hot-swappable, and each disk storage device is mounted on a bypass interface card that connects to the midplane connector.

In a presently preferred embodiment, the disk array controller subsystem controls and communicates with one or more disk storage device arrays with an arbitrated dual channel Fibre Channel system, and each of the disk storage devices are connected to the arbitrated dual channel Fibre Channel architecture, whereby each disk storage device may perform simultaneous reads and writes of data in response to any requests from the outside world through the information server. In another presently preferred aspect of the invention, the disk storage devices include electronic device registration devices, and the disk array controller subsystem monitors identification numbers of the electronic device registration devices. The disk array controller subsystem can thus monitor when a component in the information server system is removed or added. The electronic device registration devices are preferably integrated into an electronic circuitry of each of the disk devices such that engagement or disengagement of each disk storage device with the disk storage device array causes a triggering of the electronic device registration devices to generate and transmit a unique identifying serial number signal unique to each disk storage device to the disk array controller subsystem. A triggering of the electronic device registration devices preferably causes the electronic device registration devices to generate and transmit a unique identifying serial number signal unique to each disk device to the disk array controller subsystem, and upon receiving the signal, the disk array controller subsystem then immediately either initiates logical connection or disconnection of the disk device to or from the array, depending on whether the disk device has been engaged or disengaged, respectively. The disk array controller subsystem can thus accomplish the electrical and logical connection and disconnection of the disk device by control of the bypass interface cards. In another presently preferred aspect, the bypass interface cards comprise an independent but logically integrated optical bus for communication within the Fibre Channel topology and protocol between disk drives.

In another presently preferred embodiment, the disk array controller subsystem is adapted to configure one or more of the disk storage devices for a configuration selected from the group consisting of RAID 0, RAID 1, RAID 3, RAID 5, RAID 10 and an XOR RAID configuration.

In another presently preferred aspect of this invention, an operator may activate a so-called "hot button" which will disable the write function to the array, thus preventing the writing of suspect data on the storage array after a system fault has been detected.

From the above, it may be seen that the present invention provides a novel, plug and play, high speed scalable and modular fault tolerant information server architecture which offers many benefits over prior art systems. Other features and advantages of the present invention will become apparent from the following detailed description of the invention, taken in conjunction with the accompanying drawings, which illustrate, by way of example, the principles of the invention.

BRIEF DESCRIPTION OF THE DRAWINGS

Referring now to the drawings wherein like reference numerals across the several different views refer to identical or corresponding parts.

FIG. 2 is a diagrammatic representation of the Disk Array Controller subsystem of the Information Server System of FIG. 1; and FIG. 3 is a is a, diagrammatic representation of the Fault Tolerant, Fibre Channel Arbitrated Dual Loop, Hot-Swappable Disk Array subsystem of the Information Server System of FIG. 1.

DETAILED DESCRIPTION OF THE INVENTION

Figure 1:
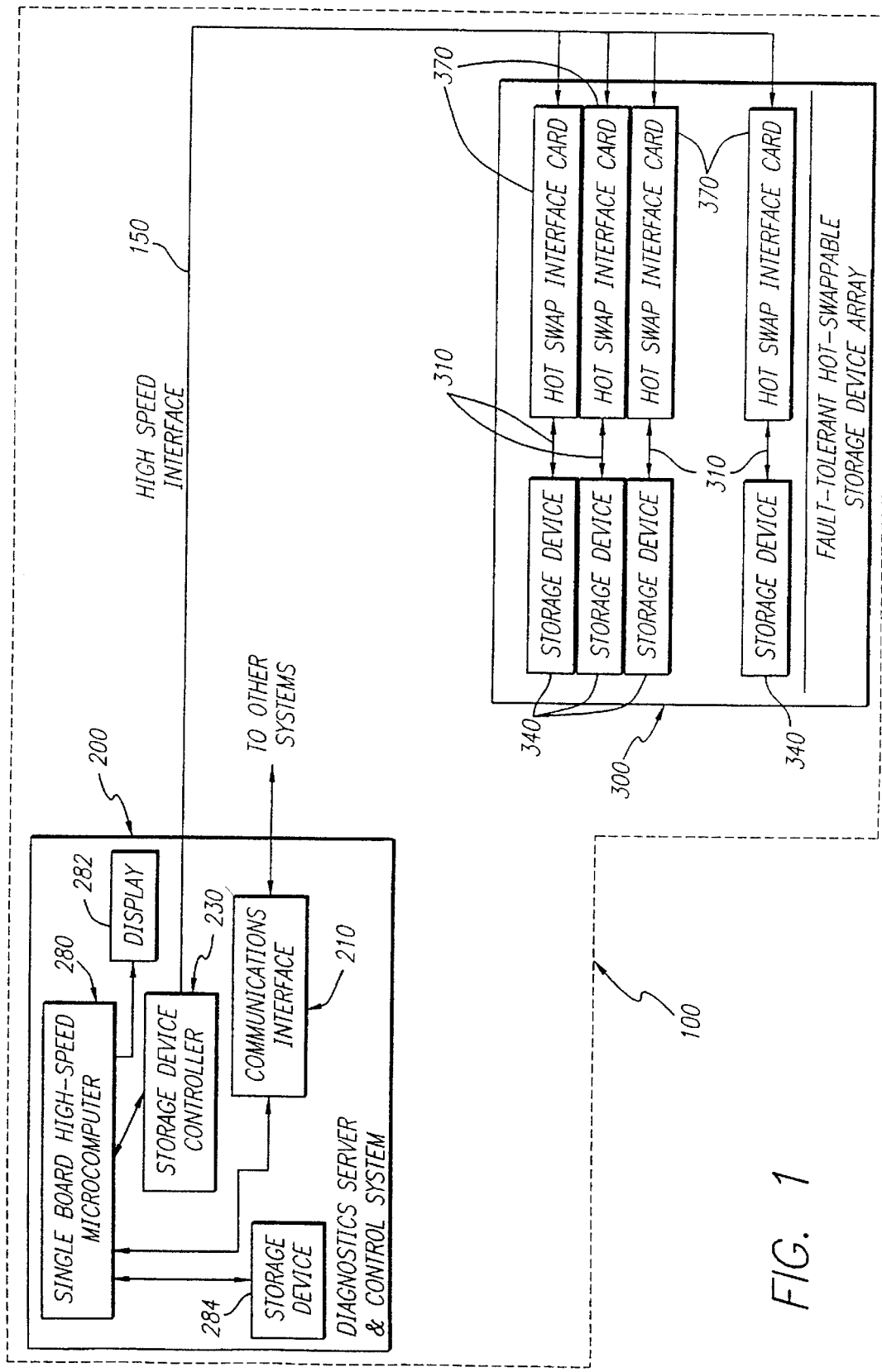
FIG. 1 is a diagrammatic representation of the Information Server System of the present invention.

As can be understood from reference to FIGS. 1–3 in the accompanying drawings, which are provided for purposes of illustration and not by way of limitation, the information server system of the present invention, designated generally by reference numeral 100, incorporates two primary subsystems, including an information server 200 and a disk storage device array 300 connected through its integral Fibre Channel architecture compatible, high speed physical and virtual backplane bus and Intelligent Input/Output, "I2O" bus to the integral and or independent and external bus 150. In the presently preferred embodiment, bus 150 is a Gigabit compact PCI/Fibre Channel interface and I₂O Bus, but other optical and copper based high speed data buses and the like are appropriate, depending upon system throughput requirements and available technology. The information server further incorporates secondary subsystems including, but not limited to, a communications interface subsystem 210, a disk array controller subsystem 230, and single board high speed computer 280 running a computer industry standard operating system software program such as, for example, Windows NT available from Microsoft Corporation.

The computer further communicates with a display 282, such as a touch screen display, and a storage device 284 such as a hard disk. The operating system software incorporates enhancements adding additional functionality directed to control of the communications interface 210, disk array controller 230 and single board computer 280. The single board computer ("SBC") 280 can include any of a wide number of suitable devices including, but not limited to, the Compact PCI CPU Board with Pentium Processor, Model No. ZT 5510, available from Ziatech Corporation. Modifications to enhance performance of the ZT 5510 can include an onboard 40 MB flash memory card for permanent storage of the non-reconfigurable portions of the Windows NT operating system software and an onboard, removable, PCMCIA 40 Mb flash memory card, "D2 FlashDisk" available from Sandisk Corporation for read/writeable storage of the reconfigurable portions of the Windows NT software. The respective manufacturer, Fibre Channel Consortium and I₂O Special Interest Group reference design data sheets and materials describing the detailed operating capabilities and specifications of each of these components are hereby incorporated by reference in their entirety.

The communications interface subsystem 210 communicates with other systems on the above described buses and incorporates any combination of a number of widely available interface and communications tertiary subsystem circuit boards in the preferred embodiment. The interface boards incorporate, among other components, digital subscriber unit ("DSU") framers which can include, for example, T-1 communications compatible DSUs such as the Model No. DS2152 chip set from Dallas Semiconductor Corp. The communications boards incorporate, among other components, multi-channel communications processors which can include, for example, the 4-channel "Quick-Chip" communications processor from Motorola Corp. The communications circuit board also includes onboard buffer memory and a high speed, Fibre Channel compatible, optical bus for intra-server-component high speed data communications as well as Fibre Channel compatible, compact PCI bridge circuitry such as the bridge chip set available from Tundra. Additionally, for improved communications diagnostic, status and health monitoring capabilities, the communications board incorporates a bit error rate tester chip set, such as the device available as Model No. DS2172 from Dallas Semiconductor, configured for communication with the SBC 280 and operating system software, via the I2O bus. Although the communications interface subsystems 210 have been described with reference to well known T-1 communications architecture, the subsystems are adaptable for compatibility with nearly all other network and telecommunications architectures, protocols and topologies including, but not limited to, T-3, DS-3, OC-3 C, OC-12C, OC-192C, FDDI, SONET, SCSI, TCP/IP, HiPPI and ATM. The respective manufacturer, consortiurn, industry association and organization reference design data sheets and materials describing the detailed operating capabilities and specifications of each of these components are hereby incorporated by reference in their entirety.

Referring generally now to the block diagram of FIG. 2, the disk array controller subsystem 230 further incorporates a high speed chip set, such as the ISP2100 Intelligent Fibre Channel Processor available from Qlogic Corp., which includes a reduced instruction set chip ("RISC") processor 235, a compact PCI interface 240, and a Fibre Channel capable, arbitrated dual loop direct disk access protocol interface 250 for maximum communications bandwidth and redundancy. This controller 230 communicates data stored on the disk array or to be stored thereon through the communications interface subsystem 210 between the disk array 300 and the outside world. The controller 230 is fully Fibre Channel compliant and is capable of controlling up to 126 disk storage devices in the disk array 300. The controller 230 is adapted to configure the disk array 300 for fault tolerant, data redundancy protocols including, but not limited to, RAID 0, 1, 3, 5, 10 (1 & 0) and the new XOR RAID configuration. The respective manufacturer, consortium, industry association and organization reference design data sheets and materials describing the detailed operating capabilities and specifications of each of these components are hereby incorporated by reference in their entirety.

With general reference to FIG. 3, the fault tolerant, Fibre Channel capable, arbitrated dual loop, hot-swappable disk storage device array subsystem 300 further includes an enclosure having a front bay of slots for receipt of disk devices 340 and a rear bay for receipt of bypass/bridging interface cards 370. The midplane of the enclosure incorporates a backbone Fibre Channel compact PCI bus in addition to physically independent, but logically integrated (within the Fibre Channel topology and protocol)I$_2$O and optical buses. The disk array 300 also incorporates a plurality of disk storage devices and a corresponding number of bypass interface cards 370, all of which communicate with one another and the information server 200 though any one or combination of the above described buses. Each disk array 300 preferably incorporates a predetermined number of bypass interface cards 370 which populate the entire enclosure of the array 300 whether or not the entire enclosure is fully populated with a corresponding disk devices 340. Thus, the bypass cards 370 maintain the logical and electrical integrity of the backbone buses of the array subsystem 300 regardless of the number of empty disk device 340 slots.

Each of the disk storage devices 340 may include any number of different storage media types including, but not limited to, optical, magnetic disk, magnetic tape, magneto-optical media, flash and bubble memory devices, compact, read-only disk ("CD-ROM"), digital video disk and other similar technology mass storage devices. In one of the preferred embodiments of the present invention, each of the disk storage devices 340 includes a physical interlock system, not shown in the drawings, which is adapted to physically engage and disengage the disk storage device 340 to and from a physical enclosure which contains the disk array 300. Such devices can specifically include, for example, any one or combination of 4.3 Gb, 9.1 Gb and 18 Gb magnetic disk drives available from Seagate Technologies. Each of the disk devices 340 fully implement the arbitrated dual channel Fibre Channel architecture such that every disk device 340 may perform simultaneous reads and writes of data in response to any requests from the outside world through the information server 200. All of such devices of the present invention include, among other components, data carriers known to the trade as electronic device registration devices.

The data carrier device preferably incorporates a 64-bit ROM with a factory specified, unique 48-bit serial number. This capability enables unique identification of each and every physical disk device 340 manufactured for use with the present invention by any number of manufacturers, industry-wide for the foreseeable future. The data carrier device is integrated into the electronic circuitry of each of the disk devices 340 so that as the physical interlock of each disk device 340 is actuated to either engage or disengage the disk device 340 from the disk array 300, the interlock also triggers the data carrier device.

This triggering of the data carrier generates and transmits a unique identifying serial number signal unique to each disk device 340 which is transmitted, for example, over the I$_2$O bus to the disk controller 230. Upon receiving the signal, the controller 230 then immediately either initiates logical connection or disconnection of the disk device 340 to or from the array 300 depending on whether the disk device 340 has been engaged or disengaged, respectively. The controller accomplishes the electrical and logical connection and disconnection of the disk device 340 by control of the bypass interface card 370. Use of the data carrier device enables remote software controlled logical engagement or disengagement of each of the disk devices in addition to the above described operations. Thus, disk device 340 connection or disconnection can be accomplished either physically by a system administrator or remotely by error monitoring software functions of either the controller 230 or operating system running on the SBC 280. Such data carrier devices are readily available from a variety of manufacturers including the "iButton" available from Dallas Semiconductor as Part No. DS 1990A.

The bypass/bridging interface cards 370 which populate the rear bay accept signals from the controller 230 to communicate via the Fibre Channel interface 150 and protocol between the storage devices, the diagnostics and the diagnostics and control system, and interfacing with the storage devices via the 310 connectors to the storage devices. Thus, each storage device can simultaneously perform multiple reads and writes within the arbitrated dual channel Fibre Channel topology and protocol capability previously described above. This capability allows remote software control to automatically detect insertion of new disk devices 340 into the disk array 300, and is thus hot swappable. Thus, automatic testing, formatting, and logical integration can occur without any intervention of administrator personnel, beyond physical insertion of a new bypass card 370 and/or disk device 340. Accordingly, when a new disk device 340 has been detected in the array 300 by receipt of the transmitted data carrier signal, unattended integration of the new disk into the array 300 topology is provided. Additionally, no degradation of the server system 100 performance will occur, since all such integration activity can be performed over the bypass card 370 optical bus. The circuitry of the bypass interface cards 370 typically incorporate any one of a number of Fibre Channel compatible bypass chip sets including, but not limited to, those available from Motorola Corp. as Part No. 10SX1189 and Vitesse Semiconductor Corp. as Part Nos. VSC7121 and VSC7122 Bypass Circuits.

For each of the disk storage device array 300 components, the respective manufacturer, consortium, industry association and organization reference design data sheets and materials describing the detailed operating capabilities and specifications of each of these components are hereby incorporated by reference in their entirety.

The method of the invention embodies the control of hot swappable interface cards and associated storage devices arranged in an array and controlled via a high speed interface with a diagnostic and control system containing a communications interface and a storage device controller. A high speed computer dedicated to system control and operation interfaces with both the communications interface and the storage device controller to sense and manage the condition of the various elements of the storage device array. By utilizing the method of the invention, the information server can be in continuous operation without the necessity of taking the system down to add storage capacity.

From the above, it will be appreciated that the present invention represents a new and novel arrangement for an information server system serving a computer information system. The system and method of the invention provide a plug and play, truly hot swappable storage device system that does not require an external host computer. The system of the invention can be directly connected to Fibre Channel networks or Ethernet connections. The system provides both hot swappability and hot expandability for storage device addition and repair without powering down or additional diagnostic activities external to the system. Because of the scalability and modularity of the architecture, the system can be adapted to virtually any capacity.

While particular forms of the invention have been illustrated and described, it will also be apparent that various modifications can be made without departing from the spirit and scope of the invention. Accordingly, it is not intended that the invention be limited, except as by the appended claims.

What is claimed is:

1. An information server system with a scalable, modular, fault tolerant, multi loop, hot swappable architecture, comprising:
    a central processing unit including a digital processor, storage device and user interface;
    a storage array controller subsystem connected to the central processing unit for controlling at least one storage device array, each said storage device array including a plurality of disk storage devices and a corresponding number of bypass interface cards, all of which communicate with one another and the information server; and
    a communications interface subsystem connected to the central processing unit for communicating with other subsystems of the information server and for controlling said storage device array controller subsystem.

2. The information server system of claim 1, further comprising a midplane connector for connecting interface cards for components.

3. The information server system of claim 2, wherein each said disk storage device is mounted on a bypass interface card that connects to the midplane connector.

4. The information server system of claim 1, wherein each said storage device array comprises a predetermined number of bypass interface cards which populate the entire information server system whether or not the entire information server system is fully populated with a corresponding number of storage devices.

5. The information server system of claim 1, wherein each said disk storage device is hot-swappable.

6. The information server system of claim 1, wherein said disk array controller subsystem controls and communicates with said at least one disk storage device array with an arbitrated dual channel Fibre Channel system.

7. The information server system of claim 6, wherein each of said disk storage devices are connected to said arbitrated dual channel Fibre Channel architecture whereby each disk storage device may perform simultaneous reads and writes of data in response to any requests from the outside world through the information server.

8. The information server system of claim 6, wherein said bypass interface cards comprise an independent but logically integrated optical bus for communication within the Fibre Channel topology and protocol between disk drives.

9. The information server system of claim 1, wherein said disk storage devices are selected from the group consisting of optical, magnetic disk, magnetic tape, magneto-optical media, flash and bubble memory devices, compact, read-only disk, and digital video disk storage devices.

10. The information server system of claim 1, wherein said disk storage devices include electronic device registration devices.

11. The information server system of claim 10, wherein said disk array controller subsystem monitors identification numbers of said electronic device registration devices.

12. The information server system of claim 10, wherein said disk array controller subsystem monitors when a component in said information server system is removed or added.

13. The information server system of claim 10, wherein said electronic device registration devices include a 64-bit ROM with a factory specified, unique 48-bit serial number.

14. The information server system of claim 10, wherein said electronic device registration devices are integrated into an electronic circuitry of each of the disk devices such that engagement or disengagement of each disk storage device with the disk storage device array causes a triggering of the electronic device registration devices to generate and transmit a unique identifying serial number signal unique to each disk storage device to said disk array controller subsystem.

15. The information server system of claim 10, wherein a triggering of said electronic device registration devices causes said electronic device registration devices to generate and transmit a unique identifying serial number signal unique to each disk device to said disk array controller subsystem, and upon receiving the signal, said disk array controller subsystem then immediately either initiates logical connection or disconnection of the disk device to or from the array, depending on whether the disk device has been engaged or disengaged, respectively.

16. The information server system of claim 10, wherein said disk array controller subsystem accomplishes the electrical and logical connection and disconnection of the disk device by control of said bypass interface cards.

17. The information server system of claim 10, wherein said disk array controller subsystem is adapted to configure said at least one disk storage device for fault tolerant, data redundancy protocols.

18. The information server system of claim 17, wherein said disk array controller subsystem is adapted to configure said at least one disk storage device for a configuration selected from the group consisting of RAID 0, RAID 1, RAID 3, RAID 5, RAID 10 and an XOR RAID configuration.

19. The information server system of claim 1, wherein said communications interface subsystem comprises a digital subscriber unit framer.

20. The information server system of claim 1, wherein said communications interface subsystem comprises an onboard buffer memory and a high speed, Fibre Channel compatible, optical bus for intra-server-component high speed data communications.

21. The information server system of claim 1, wherein said communications interface subsystem comprises a bit error rate tester chip set.

22. The information server system of claim 1, further comprising an operator controllable input device which disables the ability of the system to write new data on the storage devices of the storage device array.

23. The method of operation for an information server comprising:

establishing high speed communication with a fault tolerant, hot swappable storage device array;

sensing the status of each storage device of said array from information provided by a hot swap interface card associated with each storage device;

analyzing information regarding the status of the storage device in a computer to assess operating characteristics of the storage device and overall operation of the information server; deriving signals for control of the storage devices to maintain system operation;

communicating control signals to a service device controller for control of individual storage devices; and transmitting the control signals over a high speed interface to individual hot swap interface cards to thereby control the operation of individual storage devices.

24. The method of claim 23, further comprising the steps of: generation of a display of system status to a display panel; and receipt of inputs by the computer from a user interface.

25. The method of claim 24, further comprising the step of: use of a touch screen display to both display status and accept inputs from the system user.

* * * * *